United States Patent
Rougier

(10) Patent No.: US 10,104,207 B1
(45) Date of Patent: Oct. 16, 2018

(54) AUTOMATIC PROTOCOL DISCOVERY

(71) Applicant: Kirio Inc., Seattle, WA (US)

(72) Inventor: Franck D Rougier, Seattle, WA (US)

(73) Assignee: Kirio, Inc., Lynnwood, WA (US)

( * ) Notice: Subject to any disclaimer, the term of this patent is extended or adjusted under 35 U.S.C. 154(b) by 213 days.

(21) Appl. No.: 15/069,625

(22) Filed: Mar. 14, 2016

Related U.S. Application Data

(60) Provisional application No. 62/217,662, filed on Sep. 11, 2015.

(51) Int. Cl.
*G06F 15/16* (2006.01)
*H04L 29/06* (2006.01)

(52) U.S. Cl.
CPC ................... *H04L 69/26* (2013.01)

(58) Field of Classification Search
CPC ............... H04L 27/0012; H04L 69/26
See application file for complete search history.

(56) References Cited

U.S. PATENT DOCUMENTS

| | | | | |
|---|---|---|---|---|
| 2002/0028021 A1* | 3/2002 | Foote | ........... | G06K 9/00758 382/224 |
| 2007/0076882 A1* | 4/2007 | Engel | ........... | H04L 63/0457 380/255 |
| 2014/0006552 A1* | 1/2014 | Frei | ........... | H04L 29/1249 709/217 |

* cited by examiner

*Primary Examiner* — June Sison
*Assistant Examiner* — Steven Nguyen
(74) *Attorney, Agent, or Firm* — FSP LLC

(57) ABSTRACT

A computing apparatus is configured to operate a controller on a communication log file to infer a message structure for communications between a remote control and a controlled device. The controller applies Hidden Markov Model and Finite State Machine to the message structure to operate the remote control on the controlled device to perform predefined actions, receives a state of the controlled device, and generates a semantic classification for the message structure from the state, the semantic classification applied to operation of the controller.

12 Claims, 8 Drawing Sheets

FIG. 7

AUTOMATIC PROTOCOL DISCOVERY

CROSS-REFERENCE TO RELATED APPLICATIONS

This application claims benefit under 35 U.S.C. 119 to U.S. application Ser. No. 62/217,662, filed on Sep. 11, 2015, and incorporated herein by reference in its entirety.

BACKGROUND

Most appliances, sensors, machinery, electronic and industrial devices which implement more than a trivial on/off communication with another device and which enable a change of state or report data, implement a protocol. There are many standard protocols which enable interoperability between devices and compatible remote controllers, however, many manufacturers implement proprietary protocols for which no documentation exists or for which no remote controllers are manufactured any longer. At times, a remote controller is solely a configuration system or testing device. Many devices in the field are no longer supported either because the product is obsolete or the manufacturer is no longer in existence. Typical reverse engineering of the class of product described above takes months and can be haphazard. It is difficult and complex for the average user to rebuild the protocols of these systems, and doing so typically involves the use of human experts with fairly developed experience, specialized knowledge, and lots of tinkering.

Most users do not seek to emulate their remote controls because they can simply replace them or interface with their device via the built-in controller. In addition, the focus of reverse engineering today is concerned with security research or illicit access to higher level Information Technology systems. Such systems running on sophisticated computer servers utilize highly sophisticated software. These systems implement large language vocabularies with inherently complex virtual states. These virtual states are not apparent to the operator since they do not produce a physical process in the sensible realm, therefore, these are the systems that are targeted by reverse engineering tools.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 7:
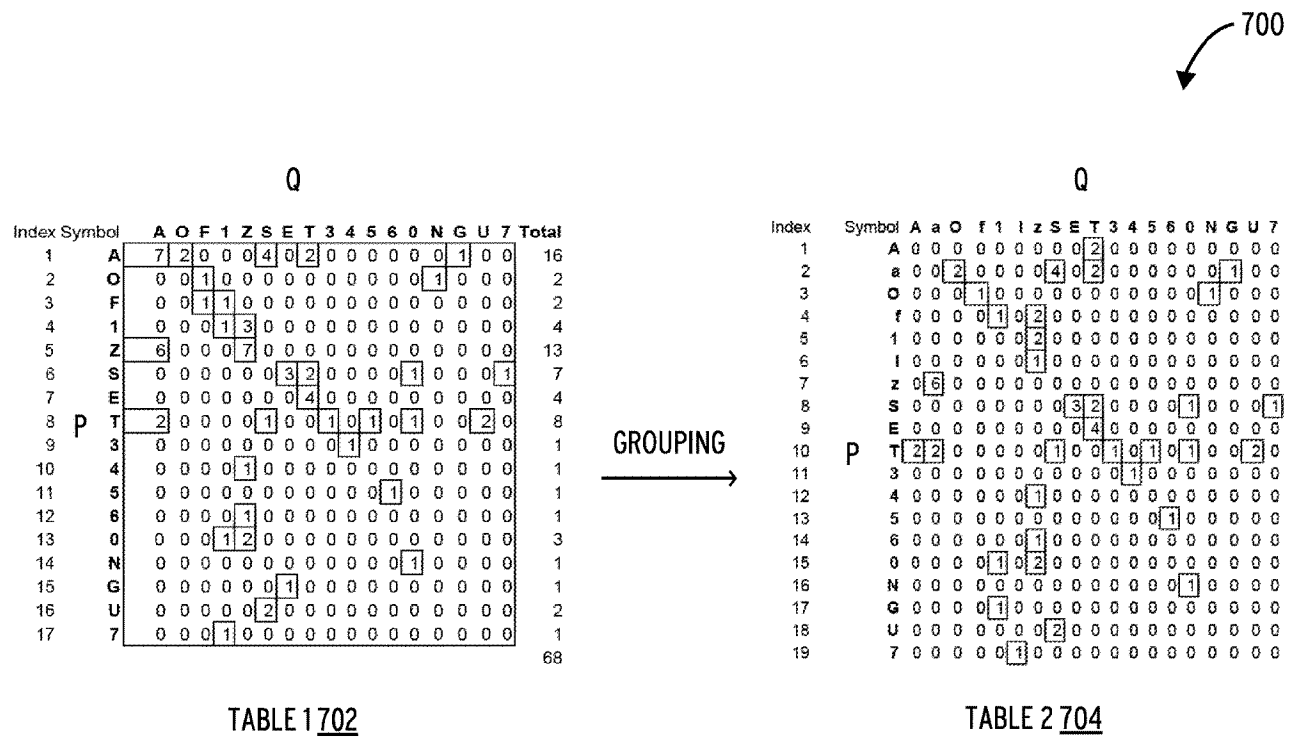

FIG. 7 illustrates an aspect of automatic process for protocol discovery 700 in accordance with one embodiment.

DETAILED DESCRIPTION

Glossary

Figure 1:
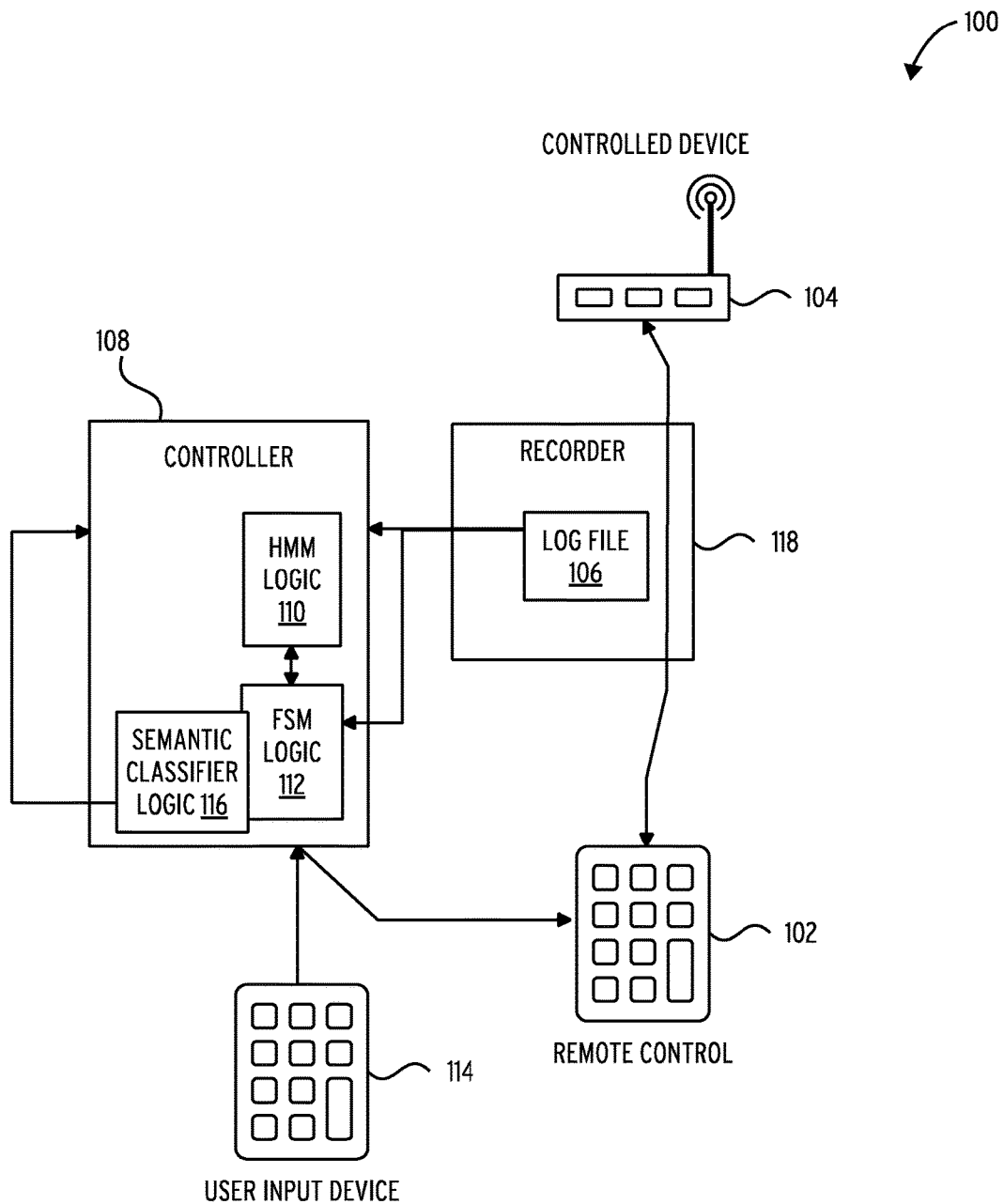
FIG. 1 illustrates a device control configuration system 100 in accordance with one embodiment.

"Finite State Machine" in this context refers to (sometimes called finite-state automaton or simply a state machine) a mathematical model of computation used to design both computer programs and sequential logic circuits. The machine can be in only one of a finite number of states at a time; the state it is in at any given time is called the current state. It can change from one state to another when initiated by a triggering event or condition; this is called a transition. A particular FSM is defined by a list of its states, and the triggering condition for each transition.

"Hidden Markov Model" in this context refers to a statistical Markov model in which the system being modeled is assumed to be a Markov process with unobserved (hidden) states. A HMM can be presented as the simplest dynamic Bayesian network.

"Needleman-Wunsch algorithm" in this context refers to an algorithm which essentially divides a large problem into a series of smaller problems and uses the solutions to the smaller problems to reconstruct a solution to the larger problem. It is also sometimes referred to as the "optimal matching algorithm" and the "global alignment technique." This algorithm is often used for optimal global alignment, particularly when the quality of the global alignment is of the utmost importance.

"Protocol" in this context refers to 1. The service (end result) rendered by the device expressed within by protocol (Semantic), 2. The device ability to effect such function in the real or logical world (Semantic), 3. The vocabulary used by the protocol to implement messages (Vocabulary), 4. The format used to encode each message of the vocabulary (Syntax), and 5. Formalities used by the protocol to exchange messages (start, stop, error conditions etc. . . . ) (Grammar).

"Tuple" in this context refers to a finite ordered list of elements. In mathematics, an n-tuple is a sequence (or ordered list) of n elements, where n is a non-negative integer. There is only one 0-tuple, an empty sequence. An n-tuple is defined inductively using the construction of an ordered pair. Tuples are usually written by listing the elements within parentheses and separated by commas; for example, (2, 7, 4, 1, 7) denotes a 5-tuple

DESCRIPTION

Embodiments of a system and process are disclosed that automatically learn usage patterns from interaction via mobile applications or an original remote control to improve energy use and predict actions to undertake within, for example, a house or office or building.

The system automatically classifies and infers from observed exchanged messages, a given communication specification (protocol). In a typical device providing a useful functionality, a remote controller can send new commands to the device in order to affect its operation. Also, a device can send a status update to the remote control so that some internal device information could be displayed to the end user. These two systems are able to exchange data in a predetermined fashion, similar to regular human languages. Similar to a human language, there is a vocabulary and a message format, which define a syntax as well as a set of processing rules which define the "grammar." Finally, the type of services (actions the device can take) available define the language semantics associated with the protocol.

Given a device and the device's remote controller, the protocol used by the device is unknown, but may be reconstructed by inferring from previously recorded transcripts.

1—The service (end result) rendered by the device expressed within by protocol (Semantics)

2—The device ability to effect such function in the real or logical world (Semantics)

3—The vocabulary used by the protocol to implement messages (Vocabulary)

4—The format used to encode each message of the vocabulary (Syntax)

5—Formalities used by the protocol to exchange messages (start, stop, error conditions etc. . . . ) (Grammar)

A 2-step process may be used whereby protocol vocabulary, syntax and grammar are automatically reconstructed from the transcript and the service and result are contextually mapped. In the $2^{nd}$ step, the device may be physically observed while the device performs its operations and learns from observation what effects such command or status update represent.

The system aids in the rapid reverse engineering of communication protocol for a set of industrial systems where the semantically defined aspect is limited (as in "finite" and "specific") because these systems provide a real-world observable output. In addition, most of these devices operate within classes of systems for which the real-world functionality is well established.

The system ingests a computer text file system representing a particular communication log. The system then operates to infer a message structure based on various statistical computations such as Hidden Markov Models (HMM) and Finite State Machines (FSM). With the initial findings, the software allows an operator to modify the system using the remote controller for known actions, which allows thy system to finally infer a semantic classification. In addition to the operator changing a parameter, the system also sends modified versions of known structure and relies on the operator to report what state the command placed the device in.

By applying machine learning and Mealy Machines, the system obtains interoperability with these devices. Understanding the protocols enables the system to emulate a two-way conversation whereby the system communicates commands which affect state and receives status updates which inform the system of the internal state of the device.

The system operates from a default state which assumes canonical messages are organized to comprise at least a beginning and/or end marker, a base command (command radix) and a list of operands, possibly with fields declaring a number descriptor for the command and operand list size. In addition, the system presumes the presence of a field comprising a computed checksum which depends on the data enclosed within the start and stop excluding their values.

Furthermore, the organization and respective sizes of fields are only assumed to remain static within the message structure. Endianness (or field orders) is not assumed and the message structure is presumed to remain static within the protocol. The system does not presume the message length to remain fixed nor that the fields appear in the given order, however within a given protocol, once defined, each field structure stays static.

A message may be structured as follows:

Field 1 Field 2 Field . . . Field N Cmd1 Start Cmd radix Cmd modifier 1 Cmd modifier n Operand 1 Operand n Operand size Cmd modifier size Checksum Stop Cmd2 Start Cmd radix Cmd modifier 1 Cmd modifier n Operand 1 Operand n Operand size Cmd modifier size Checksum Stop CmdM Start Cmd radix Cmd modifier 1 Cmd modifier n Operand 1 Operand n Operand size Cmd modifier size Checksum Stop In one embodiment, given a transcript (status updates and command file), the system delineates (cut) each field and individually labels each field's rank (order within the message structure), and groups the fields by similarity. Each field (irrespective of its ASCII, HEX or BINARY representation) represents the protocol's set of vocabulary. Similarity is defined by a symbol's ability to convey part of the protocol semantics (what to do→command or what does it represent→status update). The ranking is indicative of the symbol format within the message. Symbol and ranking define the valid sequence within the protocol. Each field may be processed into sub-atomic constituents, which yield the different layers of a given protocol. Such layering is rare among protocols between remote controls and controlled devices, but possible.

It is recognized that given the message structure above, the start and stop condition occurs at a frequency greater than that of any other structure e.g:

. . . (stop)(start)[message content](stop)(start)[message content](stop) . . .

Let start=$\alpha$ and stop=$\omega$ n messages M made out of m subfields where each field is $M_{nm}$ such that n messages contains all messages excluding $\alpha$ and $\omega$, i.e. the summation operator sigma is the string concatenation operator.

It is also recognized that start conditions occur prior to stop conditions and stop condition always precedes (from left to right, reverse if reading from right to left) start conditions. Further, the probability from $\alpha$ to $\omega$ is 100% in a given protocol.

The system encodes each character and its next neighbor using the following notation.

Let M=abcdaefgaah . . . be characters occurring in string M starting at index 1, letter a. The association of ab is noted in a 2-tuple digraph (p,q) notation where p is the index where a occurs and the incremented index+1 for q. All p in (p,q) refer to an a. Such that in the ensuing "Edge Relationship" list for a, only nodes starting with "a" are listed. In the previous string, we would write for all a-nodes: (1,2), (5,6), (9,10), (10,100) . . . (p,q) is similar to "a" (from position, to next position).

Algorithm 1: Symbol Detection (vocabulary inference):
1. Start at firstCharacter in string;
Set (indexCount=1);
2. forEach (character in string){
4. If (character was previously read){
remove from discoveredUniqueEdgesList;
Increment(characterCountList);
5.}else{
set(characterCountList=1);
}
6. set(edgeRelationshipList){
2TupleList=[index, index+1];
}
3. Increment(indexCount);
7. goTo(2)
}
8. End
1—Start with the $1^{st}$ character in the string. Set the index count to 1.
2—Do the following until all the character in the string is read 3—Each time a character is read from the input string, increment the index count 4—If the character was previously read, do not keep this character in the "Discovered Unique Edges" list but increment the corresponding "Character Count" list.

5—If not, keep in the "Discovered Unique Edges" list. Set the "Character Count" list to 1.

6—Set the "Edge Relationship" list with the 2-tuple list for the current character with (p,q)=(current character index, index+1)

7—Go to 2—

8—End

Algorithm 2: Grouping (structure inference)
discoveredUniqueEdges.
1. currentEdgeSymbol=discoveredUniqueEdges;
2. lookup (2TupleList.corespondingTo(currentEdgeSymbol);
3. index=1;
count=currentEdgeSymbol.characterCount;
4. 2TupleList.get(p1,q1);
5. if(index<count){
retrieve next 2-tuple (p2,q2) at index+1
}
6. if(index>count){
go to 12—;
}
7. if(q1=p2){
discoveredUniqueEdges.addNew(madeUpSymbol);
edgeRelationship.addNew(p1,q2).for(madeUpSymbol);
}
8. (p1,q1)removeFrom.currentEdgeRelationship;
(p2,q2)removeFrom.cunentEdgeRelationship;
9. currentEdgeSymbol.characterCount.decrement;
10. newMadeUpSymbol.characterCount.increment;
11. index=index+1;
12. goTo(4)
13. If (currentEdgeSymbol.isEmpty){
goto(15);
}
14. else{
while(currentEdgeSymbol.isNotEnded)
15. goTo(3);
}
}
16. End Grouping 1—Start with the "Discovered Unique Edges" list as "Current Edge Symbol."

2—Lookup the "Edge Relationship" 2-tuple list corresponding to the "Current Edge Symbol"

3—Initialize index=1 and count="Character Count" for "Current Edge Symbol"

4—Retrieve 2-tuple (p1, q1) at index

5—If index<count, then retrieve next 2-tuple (p2,q2) at index+1

6—If index>count, then go to 12-.

7—If q1=p2, add a new made-up symbol to "Discovered Unique Edges" and add (p1,q2) as new "Edge Relationship" for made-up symbol.

8—Remove from the current "Edge Relationship" (p1,q1) and (p2,q2).

9—Decrement "Character Count" for "Current Edge Symbol"

10—Increment "Character Count" for new made-up symbol

11—Index=index+1

12—Go to 4—

13—If "Current Edge Symbol" list is empty (fully traversed) go to 15—

14—If not, load next "Current Edge Symbol" as long as "Current Edge Symbol" list is not ended.

15—Go to 3—

16—End Grouping

Algorithm 3: Grouped Transition Probability Matrix and Hidden Markov Model (automata and grammar inference)
1. m=count(discoveredUniqueEdges);
2. matrix=createMatrix[m];
3./ 7. /8. forEach(symbol in discoveredUniqueEdges){
4. forEach(2Tuple in symbol){
total.transitionCount.from(row1.toEnd);
}
5. column.divideBy(row.characterCount);
}
9. End 1—Start with the 2-tuple list contained in "Edge Relationship", symbols in "Discovered Unique Edges" and "Character Count"

2—Lay a m×m matrix where m=count("Discovered Unique Edges")

3—Select symbol in "Discovered Unique Edges" as symbol

4—(sub-algorithm to do this) For each 2-tuple (p,q) for symbol, place a total count for transition occurrences from row=1 to m rows with col=1 to m taking the directed transition from p→q in matching (row, col)

5—To obtain, the transition probabilities, divide column to the total "Character Count" in each row 6—If there is no more next "Discovered Unique Edge", go to 9—

7—Select next "Discovered Unique Edge"

8—Go to 3—

9—End Hidden Markov Model probability matrix building

For Algorithm 3, the stop condition is a Hidden Markov Model where the transition probability "to" any other symbol is 100%. The symbol where the stop condition transitions "from" is the start condition.

Algorithm 4: Ungrouped Transition Probability Matrix and Hidden Markov Model is obtained similarly by using algorithm 3—using the ungrouped n-tuple result from Algorithm 1.

The system has now identified the start and stop symbols for the protocol, and inferred part of the message vocabulary. The specially constructed Hidden Markov Model may be used to cut sequences of commands and responses in their respective vocabulary.

The system may follow the path from start to stop (excluding the start and stop symbols from the path), reconstructing the individual message structures. The path for grammatically correct vocabulary sequences is found by following the from/to sequence as given by the (p,q) tuple found in Algorithm 2.

Path following resembles the following (start) (a,b), (b,c), (c,d), (d,e) (stop) where the path abcde represents a sentence in the protocol.

The machine may now group messages by clustering.

Message Sorting, Clustering and Grammar

In one embodiment, the Needleman-Wunsch algorithm may be used to efficiently create groups of related messages which share structural similarities. This algorithm is effective in messages with a variable length format. In further embodiments, the path traversal in Algorithm 2 may yield better results for fixed length formatted structure. The new subset of made-up characters implies a clustering pattern for same length fields. Any substituted characters aside from start and stop are grouped implicitly.

Using the output of Algorithm 3, the system may follow the probability tree of the Hidden Markov Model.

These substituted (combined) characters represent a grammatical entity within the protocol and make up the command structure and grammar. Clustering may be discovered by traversing 2-tuples pair-wise where their transition probability is higher. Further application of Algorithm 2 and Algorithm 3 yield further field detections. The grammar of the protocol is recovered from valid sequence as dictated by the Hidden Markov Model from to node to edge traversal. This constitutes the protocol automata which enables us to recreate any other valid message from the identified vocabulary.

DRAWINGS

FIG. 1 illustrates a device control configuration system 100 in accordance with one embodiment. A recorder 118 is interposed to intercept and record communications between the remote control 102 and the controlled device 104. The recorded communications are organized into a log file 106. The log file 106 is applied to a controller 108 which operates HMM logic 110 and FSM logic 112 to ascertain a structure of the machine messages in the log file 106. This structure is utilized to operate semantic classifier logic 116 which in turn affects operation of the controller 108 to generate a device control configuration for the controlled device 104.

As a user operates the remote control 102 to control the controlled device 104, a user input device 114 (keyboard, mouse, voice control, etc.) may also be operated to report to the controller 108 a state of the controlled device 104 in response to messages from the remote control 102.

Device control configuration system 100 comprises controller 108, HMM logic 110, FSM logic 112, semantic classifier logic 116, user input device 114, remote control 102, recorder 118, log file 106, and controlled device 104.

Device control configuration system 100 may be operated in accordance with the processes described in automatic process for protocol discovery 300, automatic process for protocol discovery 400, automatic process for protocol discovery 500, and device control configuration process 600.

Figure 2:
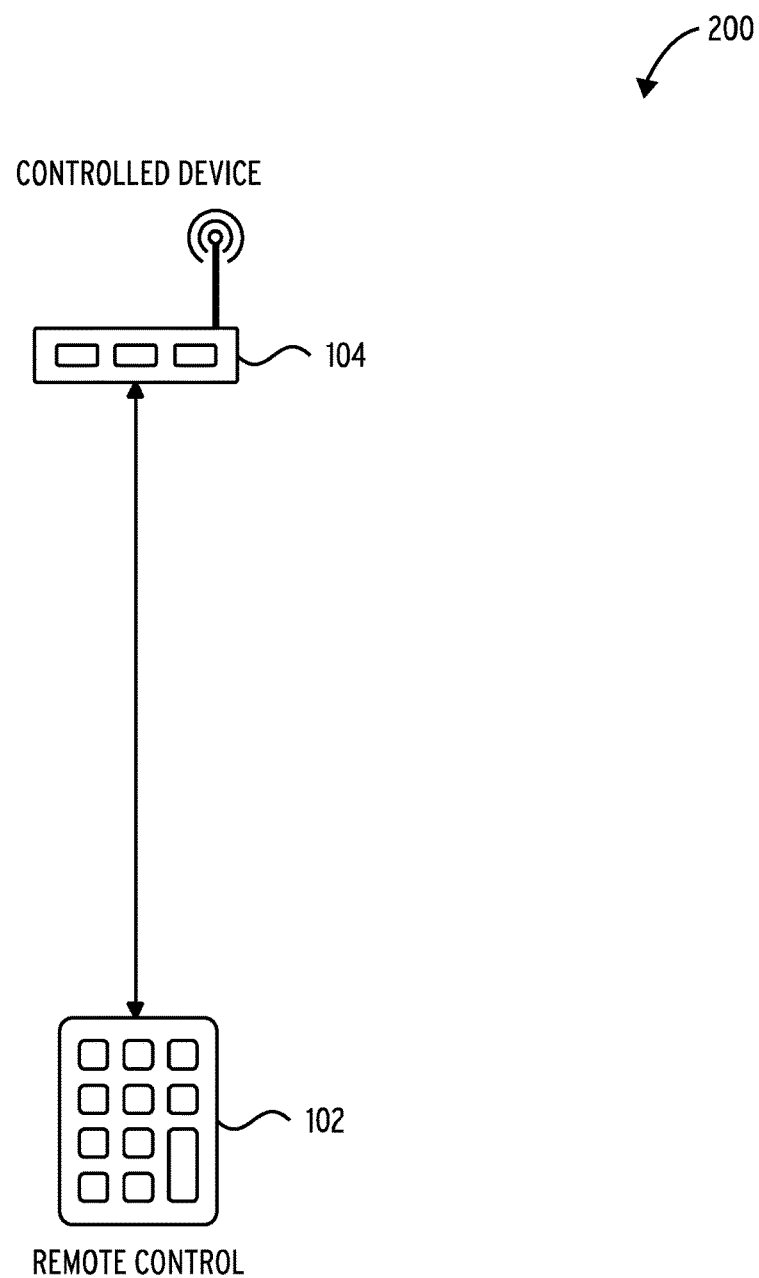
FIG. 2 illustrates a device system 200 in accordance with one embodiment.
Figure 3:
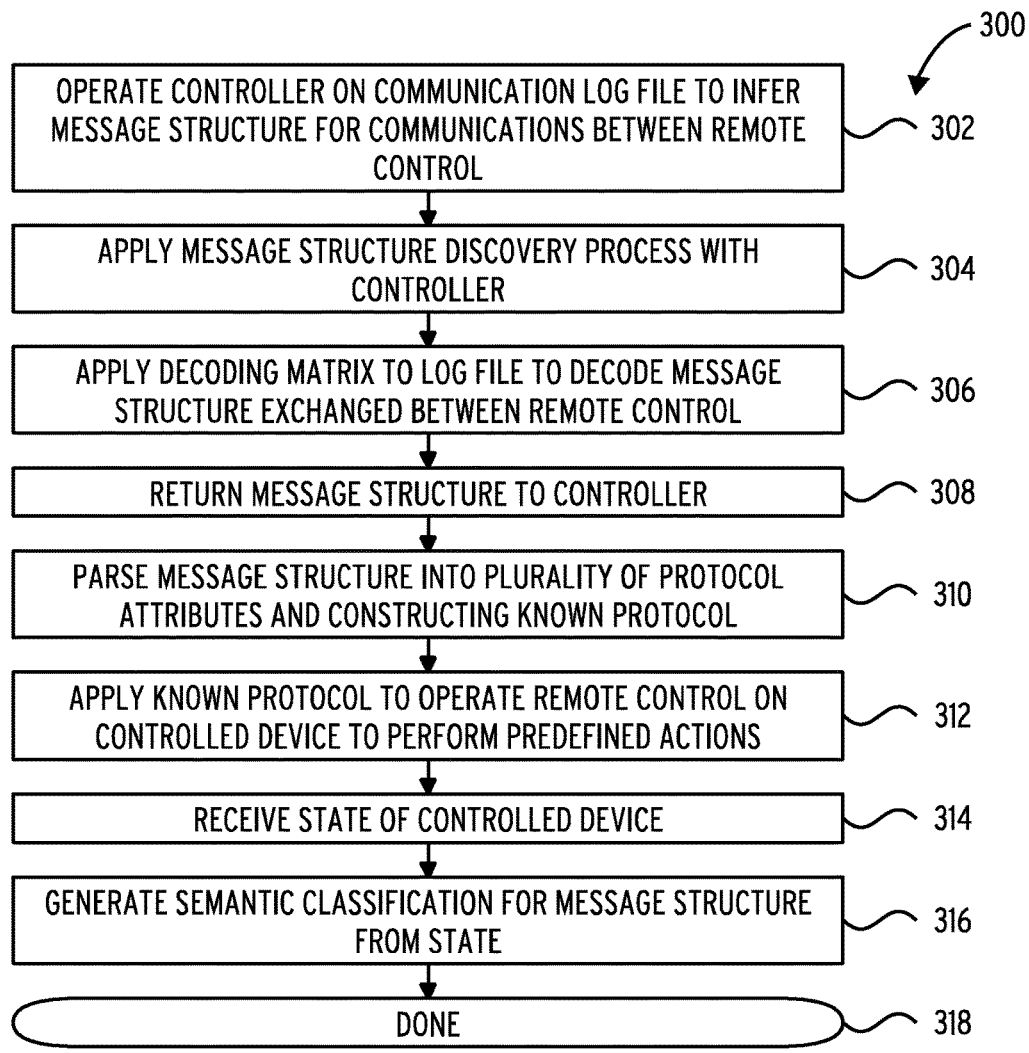
FIG. 3 illustrates an embodiment of an automatic process for protocol discovery 300
Figure 4:
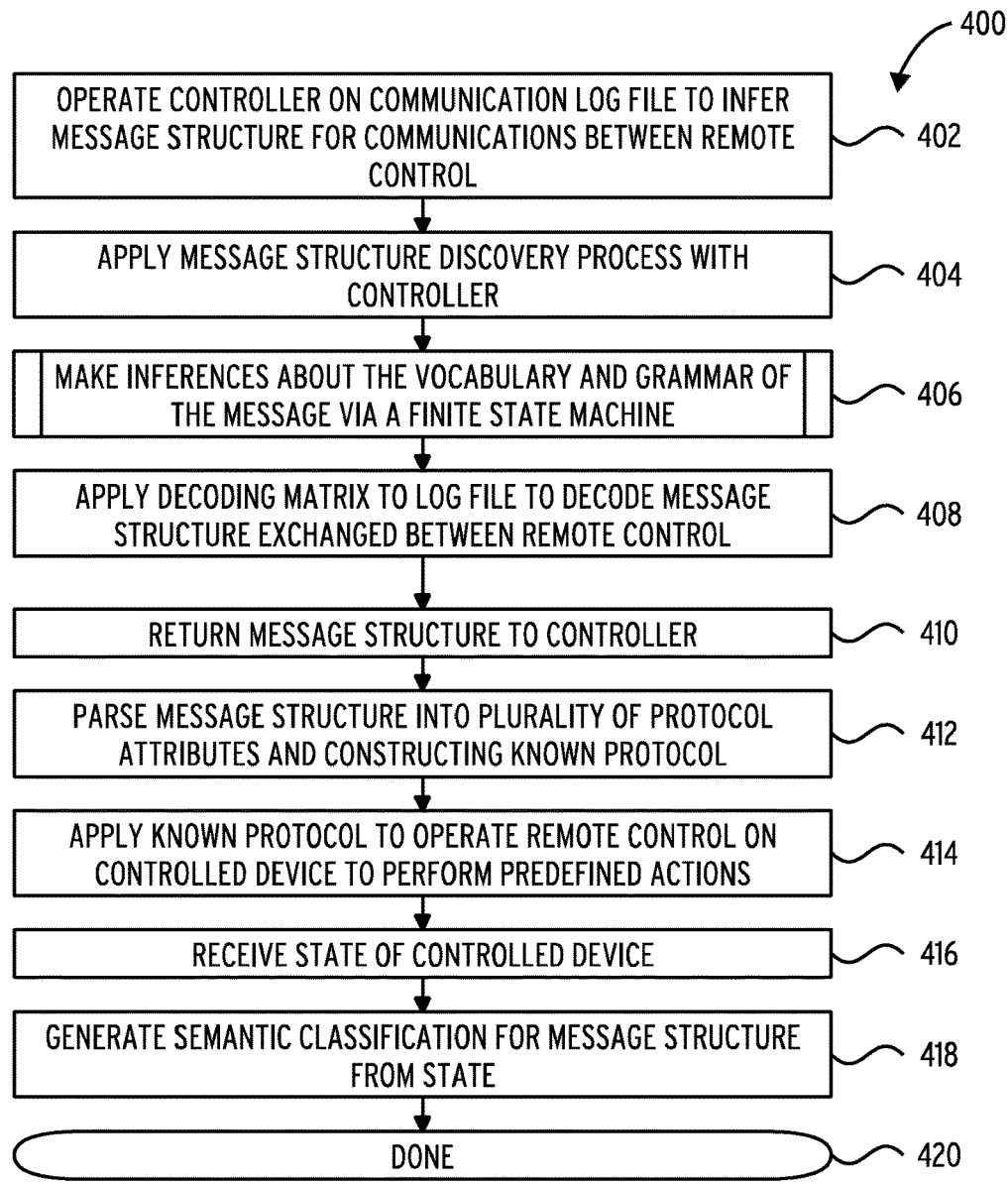
FIG. 4 illustrates an embodiment of an automatic process for protocol discovery 400.
Figure 5:
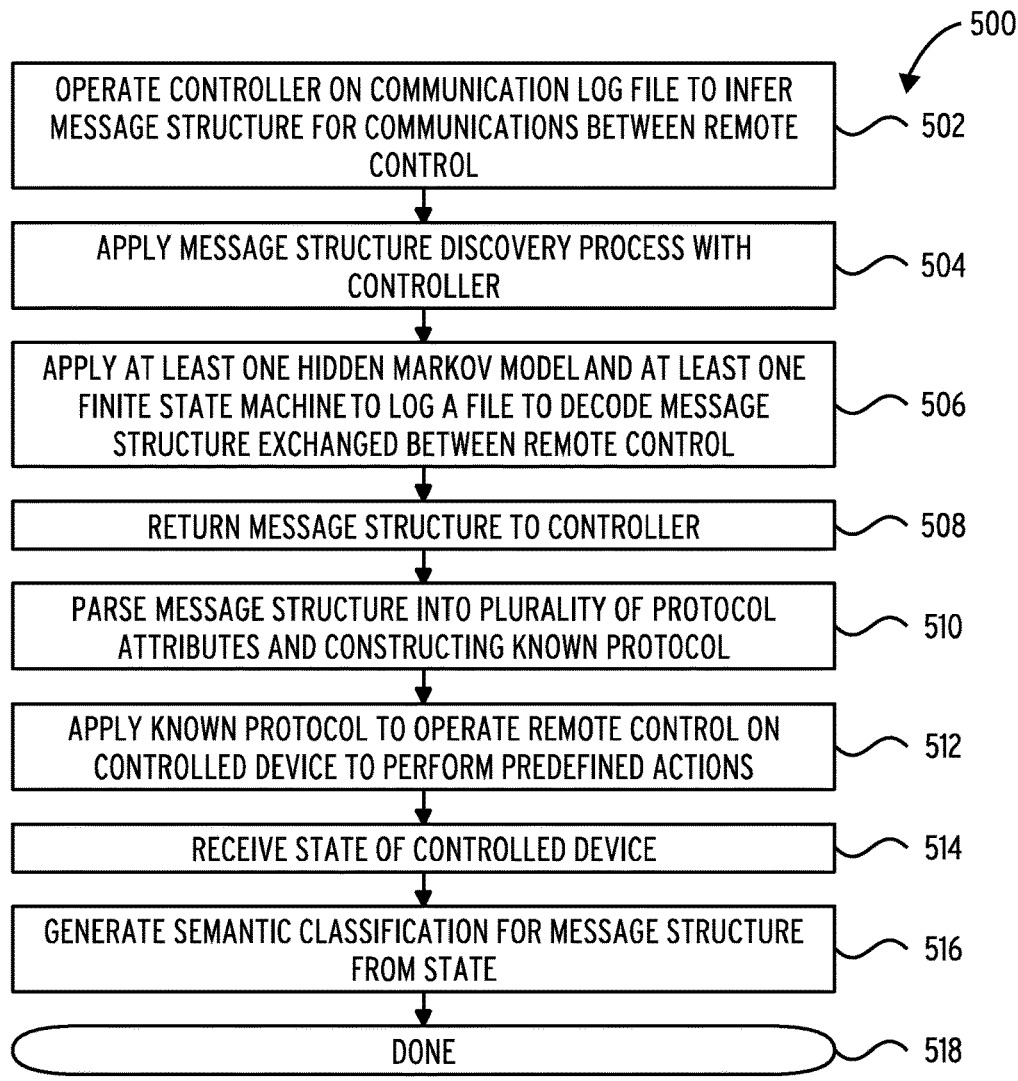
FIG. 5 illustrates an embodiment of an automatic process for protocol discovery 500.

FIG. 2 illustrates a device system 200 in accordance with one embodiment. A remote control 102 is operated in order to generate control signals to a controlled device 104. Communications between the remote control 102 and controlled device 104 may be wireless or wire line. The communications takes the form of messages having a semantic structure (bit sequences having pre-configured bounding sizes and/or sequences).

In block 302, automatic process for protocol discovery 300 operates a controller on a communication log file to infer a message structure for communications between a remote control. In block 304, automatic process for protocol discovery 300 applies a message structure discovery process with a controller. In block 306, automatic process for protocol discovery 300 applies a decoding matrix to the log file to decode the message structure exchanged between the remote control. In block 308, automatic process for protocol discovery 300 returns the message structure to the controller. In block 310, automatic process for protocol discovery 300 parses the message structure into a plurality of protocol attributes and constructing a known protocol. In block 312, automatic process for protocol discovery 300 applies the known protocol to operate the remote control on the controlled device to perform predefined actions. In block 314, automatic process for protocol discovery 300 receives a state of the controlled device. In block 316, automatic process for protocol discovery 300 generates a semantic classification for the message structure from the state. In done block 318, automatic process for protocol discovery 300 ends.

The automatic process for protocol discovery 300 improves the efficiency of the machine by allowing it to decode control protocols which might not otherwise be discoverable in a manner that is computationally efficient. This further allows the controller to control remote machines by aiding in the rapid reverse engineering of communication protocols for systems.

By using an extension of the backward-forward algorithm the system may compute the transition matrix with minimal passes and may yield quickly to clusters, fields and ranks, increasing the efficiency of the machine itself.

In block 402, automatic process for protocol discovery 400 operates a controller on a communication log file to infer a message structure for communications between a remote control. In block 404, automatic process for protocol discovery 400 applies a message structure discovery process with a controller. In block 408, automatic process for protocol discovery 400 applies a decoding matrix to the log file to decode the message structure exchanged between the remote control. In block 410, automatic process for protocol discovery 400 returns the message structure to the controller. In block 412, automatic process for protocol discovery 400 parses the message structure into a plurality of protocol attributes and constructing a known protocol. In block 414, automatic process for protocol discovery 400 applies the known protocol to a operate the remote control on the controlled device to perform predefined actions. In block 416, automatic process for protocol discovery 400 receives a state of the controlled device. In block 418, automatic process for protocol discovery 400 generates a semantic classification for the message structure from the state. In done block 420, automatic process for protocol discovery 400 ends.

The automatic process for protocol discovery 400 improves the efficiency of the machine by allowing it to decode control protocols, which might not otherwise be discoverable in a manner that is computationally efficient, by making inferences about the vocabulary and grammar of a message via a Finite State Machine. This further allows the controller to control remote machines by aiding in the rapid reverse engineering of communication protocols for systems.

In block 502, automatic process for protocol discovery 500 operates a controller on a communication log file to infer a message structure for communications between a remote control. In block 504, automatic process for protocol discovery 500 applies a message structure discovery process with a controller. In block 506, automatic process for protocol discovery 500 applies a decoding matrix to the log file to decode the message structure exchanged between the remote control. In block 508, automatic process for protocol discovery 500 returns the message structure to the controller. In block 510, automatic process for protocol discovery 500 parses the message structure into a plurality of protocol attributes and constructs a known protocol. In block 512, automatic process for protocol discovery 500 applies the known protocol to a operate the remote control on the controlled device to perform predefined actions. In block 514, automatic process for protocol discovery 500 receives a state of the controlled device. In block 516, automatic process for protocol discovery 500 generates a semantic classification for the message structure from the state. In done block 518, automatic process for protocol discovery 500 ends.

The automatic process for protocol discovery 400 improves the efficiency of the machine by allowing it to decode control protocols, which might not otherwise be discoverable in a manner that is computationally efficient, by applying at least one Hidden Markov Model and at least one Finite State Machine. This further allows the controller to control remote machines by aiding in the rapid reverse engineering of communication protocols for systems.

Figure 6:
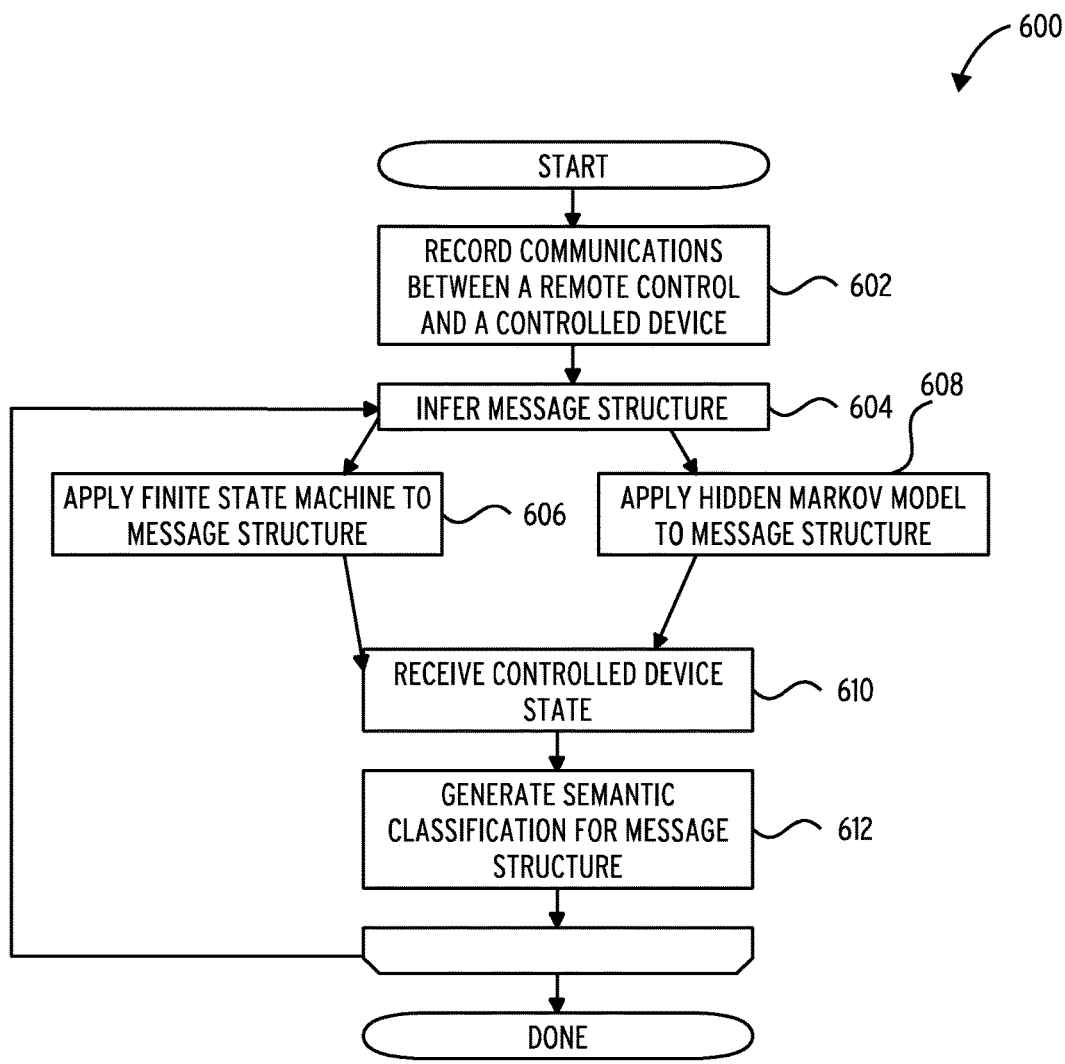
FIG. 6 illustrates a device control configuration process 600 in accordance with one embodiment.

FIG. 6 illustrates a device control configuration process 600 in accordance with one embodiment. In block 602, communications between a remote control 102 and a controlled device 104 are recorded. In block 604 a message structure is inferred from the recorded information. In block 606, a Finite State Machine is applied to the inferred structure. In block 608, a Hidden Markov Model is applied to the inferred structure. In block 610 the state of the controlled device 104 is received. These are all applied to ascertain and generate a semantic classification for the message structure (block 612). This process is repeated as new communications are recorded and new states of the controlled device 104 are received, until a full semantic classification is ascertained, which can then be applied as a control configuration for the controlled device 104. The control configuration may be configured into memory of the remote control 102 or other controlling devices of the controlled device 104 (e.g., a home control computer system).

The automatic process for protocol discovery 400 improves the efficiency of the machine by allowing it to decode control protocols, which might not otherwise be discoverable in a manner that is computationally efficient, by making inferences about the vocabulary and grammar of a message by applying at least one Hidden Markov Model and at least one Finite State Machine. This further allows the controller to control remote machines by aiding in the rapid reverse engineering of communication protocols for systems.

The 2-tuple digraph used to express a current symbol's index (p) and the index of the symbol it transitions to (q) which occurs at index+1. Unique edges are discovered by determining the transition points from one symbol to the next.

Using algorithm 2, if a symbol transitions to a repeat of itself, (for instance, A transitions to A seven times in table 1 702), the doubled instance of that symbol is replaced with newly created symbol. In this case, "AA" in table 1 702 is grouped into "a" in table 2 704. Using algorithm 3 the system may obtain the transition probabilities by dividing a column by the total character count in each row.

The system may obtain the probability matrix for the Hidden Markov Model, by dividing each count by the total.

Figure 8:
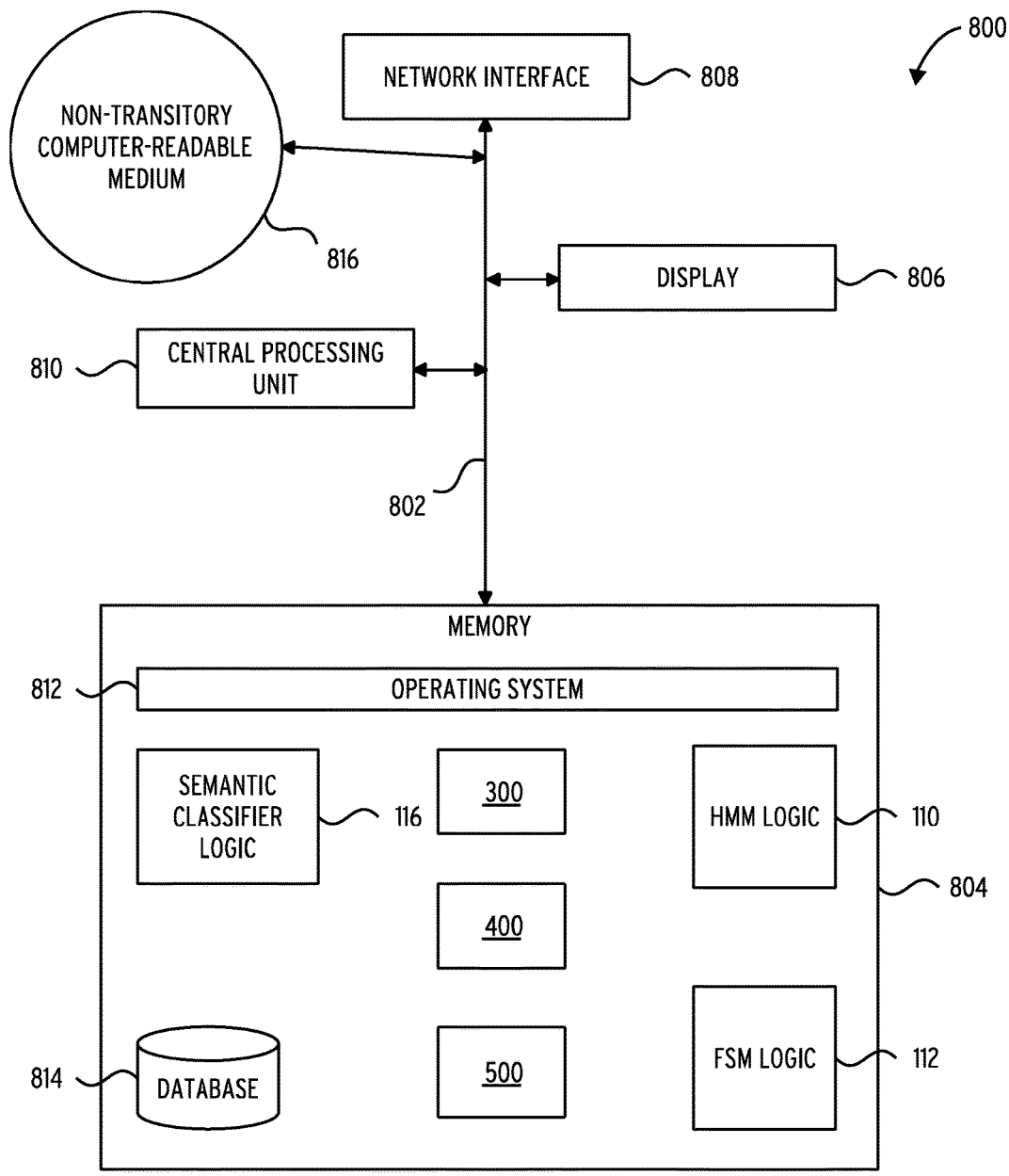
FIG. 8 illustrates a controller 400 in accordance with one embodiment.

FIG. 8 illustrates several components of an exemplary controller 800 in accordance with one embodiment. In various embodiments, controller 800 may include a desktop PC, server, workstation, mobile phone, laptop, tablet, set-top box, appliance, or other computing device that is capable of performing operations such as those described herein. In some embodiments, controller 800 may include many more components than those shown in FIG. 8. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, controller 800 may comprise one or more physical and/or logical devices that collectively provide the functionalities described herein. In some embodiments, controller 800 may comprise one or more replicated and/or distributed physical or logical devices.

In some embodiments, controller 800 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Controller 800 includes a bus 802 interconnecting several components including a network interface 808, a display 806, a central processing unit 810, and a memory 804.

Memory 804 generally comprises a random access memory ("RAM") and permanent non-transitory mass storage device, such as a hard disk drive or solid-state drive. Memory 804 stores an operating system 812.

These and other software components may be loaded into memory 804 of controller 800 using a drive mechanism (not shown) associated with a non-transitory computer-readable medium 816, such as a floppy disc, tape, DVD/CD-ROM drive, memory card, or the like.

Memory 804 also includes database 814. In some embodiments, server 200 (deleted) may communicate with database 814 via network interface 808, a storage area network ("SAN"), a high-speed serial bus, and/or via the other suitable communication technology.

In some embodiments, database 814 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method comprising:
    operating a controller on a remote control transceiver to collect an unknown signal from a remote controlled device and writing the unknown signal to temporary memory as an unknown signal log file;
    applying a message structure discovery process comprising:
    applying a decoding matrix to the unknown signal log file to decode a message structure;
    parsing the message structure into a plurality of protocol attributes and constructing a known protocol;
    configuring the remote control transceiver with the known protocol and a remote controlled device state to transmit a state-change command to the remote controlled device;
    receiving an updated remote controlled device state and generating a semantic classification for the message structure from the updated remote controlled device state; and
    applying the semantic classification to the controller to generate a final remote control transceiver configuration; and
    mapping the final remote control transceiver configuration to the remote controlled device to pre-configure the remote control transceiver to transmit and receive commands from the remote controlled device.

2. The method of claim 1, wherein the message structure discovery process comprises inferences of the vocabulary and grammar of the message and via a Finite State Machine.

3. The method of claim 1, wherein the decoding matrix comprises at least one Hidden Markov Model and at least one Finite State Machine.

4. The method of claim 1, wherein the message structure discovery process is repeated more than one time to further refine the content of the communications.

5. A non-transitory computer-readable storage medium, the computer-readable storage medium including instructions that when executed by a computer, cause the computer to:
- operate a controller on a remote control transceiver to collect an unknown signal from a remote controlled device and writing the unknown signal to temporary memory as an unknown signal log file;
- apply a message structure discovery process comprising:
- apply a decoding matrix to the unknown signal log file to decode a message structure;
- parse the message structure into a plurality of protocol attributes and constructing a known protocol;
- configure the remote control transceiver with the known protocol and a remote controlled device state to transmit a state-change command to the remote controlled device;
- receive an updated remote controlled device state and generating a semantic classification for the message structure from the updated remote controlled device state; and
- apply the semantic classification to the controller to generate a final remote control transceiver configuration; and
- map the final remote control transceiver configuration to the remote controlled device to pre-configure the remote control transceiver to transmit and receive commands from the remote controlled device.

6. The computing apparatus of claim 5, wherein the message structure discovery process comprises inferences of the vocabulary and grammar of the message and via a Finite State Machine.

7. The computing apparatus of claim 5, wherein the decoding matrix comprises at least one Hidden Markov Model and at least one Finite State Machine.

8. The computing apparatus of claim 5, wherein the message structure discovery process is repeated more than one time to further refine the content of the communications.

9. A computing apparatus, the computing apparatus comprising:
- a processor; and
- a memory storing instructions that, when executed by the processor, configure the apparatus to:
- operate a controller on a remote control transceiver to collect an unknown signal from a remote controlled device and writing the unknown signal to temporary memory as an unknown signal log file;
- apply a message structure discovery process comprising:
- apply a decoding matrix to the unknown signal log file to decode a message structure;
- parse the message structure into a plurality of protocol attributes and constructing a known protocol;
- configure the remote control transceiver with the known protocol and a remote controlled device state to transmit a state-change command to the remote controlled device;
- receive an updated remote controlled device state and generating a semantic classification for the message structure from the updated remote controlled device state; and
- apply the semantic classification to the controller to generate a final remote control transceiver configuration; and
- map the final remote control transceiver configuration to the remote controlled device to pre-configure the remote control transceiver to operation of transmit and receive commands from the remote controlled device.

10. The computer-readable storage medium of claim 9, wherein the message structure discovery process comprises inferences of the vocabulary and grammar of the message and via a Finite State Machine.

11. The computer-readable storage medium of claim 9, wherein the decoding matrix comprises at least one Hidden Markov Model and at least one Finite State Machine.

12. The computer-readable storage medium of claim 9, wherein the message structure discovery process is repeated more than one time to further refine the content of the communications.

* * * * *